United States Patent [19]

Hitch et al.

[11] Patent Number: 5,358,560
[45] Date of Patent: Oct. 25, 1994

[54] SOLID-FORM ADDITIVE SYSTEMS DISPERSIBLE IN AQUEOUS MEDIA AND METHOD FOR THEIR PREPARATION

[75] Inventors: Brenda J. Hitch; Mahendra K. Sharma, both of Kingsport; Leo P. Voetgli, Blountville, all of Tenn.

[73] Assignee: Eastman Chemical Company, Kingsport, Tenn.

[21] Appl. No.: 771,908

[22] Filed: Oct. 4, 1991

[51] Int. Cl.$^5$ ............................................. C09D 7/14
[52] U.S. Cl. .................................. 106/499; 106/270; 106/271; 106/272; 106/436; 106/453; 106/455; 106/468; 106/482; 106/485; 106/502; 106/504
[58] Field of Search ............... 106/270, 271, 272, 436, 106/453, 455, 468, 482, 485, 499, 502, 504

[56] References Cited

U.S. PATENT DOCUMENTS

| | | | |
|---|---|---|---|
| 4,880,470 | 11/1989 | Hyche et al. | 106/271 |
| 4,898,616 | 2/1990 | Hyche et al. | 106/271 |
| 4,960,644 | 10/1990 | Hyche et al. | 106/271 |
| 4,960,814 | 10/1990 | Sharma et al. | 524/312 |
| 4,975,120 | 12/1990 | Sharma et al. | 106/271 |
| 5,007,961 | 4/1991 | Hyche et al. | 106/18 |
| 5,025,004 | 6/1991 | Sharma et al. | 514/165 |
| 5,153,029 | 10/1992 | Sharma | 427/213.36 |
| 5,204,022 | 4/1993 | Sharma | 106/499 |

FOREIGN PATENT DOCUMENTS 9102020 2/1991 PCT Int'l Appl. .

*Primary Examiner*—David Brunsman
*Attorney, Agent, or Firm*—Mark A. Montgomery

[57] ABSTRACT

Solid form additive systems which are dispersible in aqueous media are disclosed, as are methods for preparing such additive systems. The additive systems are dry, free-flowing particulate materials that contain at least one additive component, at least one tackifying agent, and at least one surfactant.

16 Claims, No Drawings

SOLID-FORM ADDITIVE SYSTEMS DISPERSIBLE IN AQUEOUS MEDIA AND METHOD FOR THEIR PREPARATION

FIELD OF THE INVENTION

This invention relates to solid form additive systems which are dispersible in aqueous media. In another aspect, the present invention relates to the preparation of such additive systems.

BACKGROUND OF THE INVENTION

Additives are used in polymeric materials for a large number of processing and end product purposes. The additives employed to treat polymeric materials generally include antioxidants, processing aids, slip agents, antiblocking agents, antistatic agents, blowing agents, lubricants, UV stabilizers, coupling agents, colorants, flame retardants, and metal deactivators.

The purpose of the various methods of introducing additives to polymeric materials is to provide sufficiently intimate contact of additive and polymeric material such that the additives perform their intended purpose. Other considerations that are important in evaluating the various methods of contacting additive and polymeric material include capital requirements, heat history subjected to polymer, degradation of heat sensitive additives, accurate measured addition of additives, versatility in meeting different additive package needs, range of acceptable additives in process, effect of process on downstream processing of polymer, environmental impact, and finally the addition system packaging, shipping, storage, inventory requirements, and convenience.

Known methods of introducing additives to polymeric particles include dry blending the materials, melting, and compounding the melted blend with extruders and pelletizing or powdering to the desired physical form.

Another method of introducing additives to polymeric particles is to contact such particles with additive at the extruder hopper during end use processing. Additives such as colorants, slip agents, processing aids, blowing agents, and others are introduced to virgin polymeric particles at this stage usually in concentrate form. In many instances, difficulty is encountered in metering the exact amounts of additive concentrate necessary to do a specific job. This is especially true for additives such as processing aids and external lubricants which are used at very low levels and usually cannot be added in a concentrate form.

Some polymers are presently being manufactured with technology that does not lend itself to such techniques as melt compounding and pelletizing. Many polymers such as high density polyethylene, linear low density polyethylene, and polypropylene emerge from the polymerization reactor in a dry granular form, i.e., in a form similar to that of a fluidized bed system. Presently, additives for these polymers must be introduced by melting, compounding, and then pelletizing. This extra step increases the cost of such polymer manufacturing operations and can adversely affect the properties of such polymers.

Another method of coating polymeric particles with additives is disclosed in Japanese Patent 56-021815. This patent teaches contacting polypropylene granules with a dispersion of additives in a solvent, followed by removal of the solvent. While some stabilization is thereby imparted to the coated polypropylene granules, the treated pellets have severe static electricity problems when subsequently processed, such as for example, by extrusion.

Some methods of coating polymeric materials with additives include the addition of the additive directly into the polymerization reactor such as disclosed in U.S. Pat. No. 4,853,426 and U.S. Pat. No. 4,879,141. These methods of mixing the polymeric materials with additive are not possible when using heat sensitive additives or additives with incompatible melting points. Additionally, these methods are not very versatile in that the polymer must be coated during production of the entire output of the reactor for the fixed reaction time.

Improved methods of contacting additives with polymeric materials are by way of the application of an aqueous emulsion system such as disclosed in U.S. Pat. No. 4,975,120. These aqueous emulsions or dispersions can be applied by spray, wipe, dip systems, or the like, to coat the polymeric particles before their normal drying or degassing operations.

While the latter application system represents an advance in the state of the art by replacing the need for organic solvents with aqueous-based application systems, the preparation of an emulsion requires special equipment and the emulsion needs to remain stable until use. The main disadvantage of this aqueous application system is that it contains substantial quantities of water. The presence of this water requires the shipping of a large volume to receive the desired amount of additives. The presence of water also requires special handling and shipping of the aqueous emulsions or dispersions. For example, these emulsions or dispersions tend to freeze when exposed to extremely cold temperatures. Unfortunately, merely heating the frozen emulsion or suspension does not always result in the re-formation of stable emulsions or dispersions. Thus, exposure to temperature extremes and long term storage can cause problems in processing these aqueous emulsions or dispersions when it is attempted to apply these additive systems to polymer particles.

In order to overcome the above-described limitations of the prior art, it would be desirable to prepare additive systems for the treatment of polymer particles wherein the additive systems can be easily handled and transported, yet are readily water dispersible to produce aqueous application systems useful for the treatment of polymer particles.

SUMMARY OF THE INVENTION

In accordance with the present invention, a wide range of additives, such as antioxidants, thermal stabilizers, colorants, and the like, can be rendered water dispersible, and, when coated, adhered to the polymeric particles. The composition of the present invention is in fine particulate form and contains polymer additive, tackifying agent that is non-tacky up to about 50° C., and a surfactant having a hydrophobic-lipophobic balance (HLB) of at least 4, wherein the surfactant is intimately coated on the particles of additive and tackifying agent.

DETAILED DESCRIPTION OF THE INVENTION

The applicants have unexpectedly discovered a composition containing polymer additive, tackifying agent and surfactant that forms a uniform dispersion in water with only mild agitation and has good physical properties for application to polymeric particles. Applicants unexpectedly discoverd that a suspension is sufficient for use in forming suitable coatings on polymer particles and that an emulsion of these additives, tackifying agents and surfactant is not required, i.e., an intimately homogeneous emulsion is not a requirement to form a sufficiently uniform distribution of additive and tackifying agent to coat polymeric particles and protect these particles until the coated polymer particles are melt mixed as in final piece formation. It is sufficient to coat this dispersion on particles and depend on the next melting phase to obtain the desired homogeneous mixture.

The tackifying agent can be an emulsifiable wax but this is not a requirement for the present invention since an emulsion is not required. This material, which has not been emulsified, is very different from an emulsion and forms a less uniform distribution of additive and tackifying agent on the polymeric particles. However, this less uniform distribution is not a significant drawback to the present invention, particularly in view of the advantages of producing and shipping a dry composition and the ease in forming a dispersion instead of an emulsion prior to coating the polymeric particles. It is very desirable to have a particulate solid form that can be easily shipped and then dispersed at the end-user site when and in quantities needed.

The water dispersible particulate composition according to the present invention comprises:
  (a) about 5 to 99 wt. % based on the total weight of the dry composition of at least one polymer additive component,
  (b) up to 95 wt. % based on the total weight of the dry composition of at least one tackifying agent that is non-tacky up to about 50° C., wherein said tackifying agent can also be the polymer additive component of (a), and
  (c) about 0.2 to 20 wt. % based on the total weight of the dry composition of at least one surfactant, having an HLB of at least 4, wherein the surfactant is intimately coated on particles of (a) and particles of (b), or particles that comprise a mixture of (a) and (b)
  wherein no more than 10% of the composition is in the form of permanent aggregate particles larger than 600 microns that are not easily separable in water.

Although (a) and (b) could possibly be the same compound, it is preferred that they be different compounds.

The composition, or system, of the present invention is generally resistant to blocking and is a free-flowing particulate material such as a powder. This system generally contains less than 15 percent water but preferably contains less than 10, more preferably less than 5 wt % water while the system containing less than 1 wt % water is the most preferred.

The inventive water dispersible additive systems are easily handled because of their solid, typically free-flowing form. Once needed, the invention water dispersible additive systems can be readily dispersed in water to produce an aqueous dispersion without requiring any special emulsifying or mixing means, however, if desired an emulsion of the present system could be produced. This dispersion can then be used to coat polymeric particles before the normal drying or degassing operations employed in the normal polymer preparation and treatment environment. Coating of polymeric particles can be accomplished employing a variety of techniques, e.g., employing spray, wipe or dip systems.

The preferred particles of the present invention are predominantly a mixture of discrete particles of polymer additive and particles of tackifying agent coated with a surfactant. It is preferred that no more than about 5 wt %, preferably no more than about 1 wt % and more preferably no more than 0.1 wt %, of the composition be in the form of particles or permanent aggregates of particles larger than 600 microns that are not easily separable in water. It is most preferred that almost 100% of the particles be able to be formed into a dispersion in water with essentially no particles larger than 600 microns.

To produce a final composition of fine particles, the raw materials or components used in making the composition of the present invention should be provided or at least milled to a volume average mean particle size between about 5 and 60 microns, more preferably between about 10 and 45 microns.

The amount of aggregates in the final composition may be reduced if necessary by adequate milling of the composition. Additionally, once the composition is in fine particulate form, storage under humid conditions and/or at a temperature near the melting point of the composition should be avoided so as to prevent aggregates from forming.

The resulting particles of the dry composition of the present invention preferably have a mean size of 0.025–0.075 L microns wherein L represents the length of the polymer pellets or particles, in microns, that are to be coated with the powder composition of the present invention. As the size of the pellets or particle to be coated decreases so does the preferred mean particle size of the coating composition. If these pellets are about 1 mm in diameter then the mean particle size of the particles of the present invention should be between about 5 and 60 microns.

In accordance with another embodiment of the present invention, there is provided a process for producing a water-dissipatable composition comprising intimately mixing 5 to 99 wt % of at least one polymer additive component and about 1 to 95 wt % of at least one tackifying agent with about 0.2 to 20 wt % of at least one surfactant for a time to sufficiently coat the additive component and tackifying agent and wherein up to 100 wt % of said additive component can be replaced by said tackifying agent wherein no more than 10 wt % of the resulting composition is in the form of permanent aggregate particles larger than 600 microns that do not break up easily in water.

In accordance with still another embodiment of the present invention, there is provided a process for dispersing water insoluble polymer additives in aqueous medium by adding the above-described compositions to aqueous media under conditions of agitation and for a time sufficient to wet the composition with water.

The compositions of the present invention, when in the form of dispersions, preferably have low foam.

In accordance with a further embodiment of the present invention, there is provided a method of applying additives to polymeric particles comprising contacting such particles with the above-described aqueous dispersion or emulsion and drying the resulting particles.

In accordance with a still further embodiment of the present invention, there are provided stabilized polymer particles treated by the above-described method.

The composition of the present invention is preferably mixed with water at a temperature of about 10° to 60° C. for sufficient time to disperse the composition or by applying the disperse composition onto polymers and then drying the coated polymers. The composition of the present invention is preferably dispersed in water and then sprayed onto polymer particles. The dispersion of the composition of the present invention in water has a viscosity of between about 2 and 1000 cp at 25° C., preferably between about 2 and 100 cp with between about 2 and 50 cp being most preferred at a shear rate of 10 1/S.

The drying or degassing of the coated polymeric particles can be conducted at room temperature but is preferably conducted at a temperature that softens or melts the tackifying agent. This temperature is preferably between the melting point of the tackifying agent up to below the melting point of the polymeric particles, more preferably between about 60° and 150° C. with a temperature of about 70° to 80° being most preferred.

The invention water dispersible additive systems can be formulated for treating a wide variety of polymeric materials which can then be formed into articles made from such polymer particles. The resulting particles can be used in a wide range of applications, e.g., as film or packaging for food, medicine, and the like.

Polymers which emerge from the polymerization reactor in particle form would substantially benefit from the application of such aqueous emulsions containing antioxidants and other additives by means of such an aqueous treatment. This means of introducing additives would eliminate melt compounding, lower production energy requirements, and minimize heat history on the polymer particles.

The additive compositions used in the present invention are preferably selected from antioxidants, blowing agents, coupling agents, antistatic agents, nucleating agents, metal deactivators, lubricants-slip/antiblocking agents, UV inhibitors, flame retardants, and mixtures thereof.

Antioxidants, when used in the present invention, are preferably selected from tetrakis[methylene 3-(3',5'-di-tert-butyl-4'-hydroxyphenyl)propionate]methane, octadecyl 3-(3',5'-di-t-butyl-4-hydroxyphenyl)propionate, 1,3,5-trimethyl-2,4,6-tris-(3,5-di-tert-butyl)-4-(hydroxybenzyl)benzene, bis(2,4-di-t-butylphenyl) pentaerythritol diphosphite, tris(mono nonyl-phenyl)phosphite, 4,4'-butylidene-bis(5-methyl-2-t-butyl)phenol, tris(3,5-di-t-butyl-4-hydroxybenzyl)-isocyanurate, trisnonylphenyl phosphite; distearyl pentaerythritol diphosphite; tetrakis-(2,4-di-t-butylphenyl)4,4'-biphenylylenediphosphonite; tris-(2,3di-t-butylphenyl) phosphite; butylated hydroxy toluene; dicetyl thiodipropionate; dimyristyl thiodipropionate; and poly(1,4-cyclohexylenedimethylene-3,3'-thiodipropionate (partially terminated with stearyl alcohol).

Blowing agents, when used in the present invention, are preferably selected from modified and unmodified azodicarbonamides, such as p-toluene sulfonyl semicarbizide and modified and unmodified azocarbonamides.

Coupling agents, when used in the present invention, are preferably selected from silanes; titanates; chromium complexes; low molecular weight polyolefins (with carboxylic moieties); high molecular weight polyolefins and acrylates (with carboxylic moieties); and chlorinated paraffins.

Antistatic agents, when used in the present invention, are preferably selected from ethyoxylated amines; polyethylene glycol; and quaternary ammonium compounds (salts).

Nucleating agents, when used in the present invention, are preferably selected from sodium benzoate; diphenyl phosphinic acid (including magnesium, sodium, calcium, aluminum salts); phenyl phosphinic acid (including salts); and phenyl phosphorous acid (including salts).

Metal deactivators, when used in the present invention, are preferably selected from oxalyl bis(benzylidene hydrazide); and 2,2'oxamido bis-(ethyl 3-(3,5-di-t-butyl-4-hydroxy-phenyl) propionate.

Lubricant slip/antiblocking agents, when used in the present invention, are preferably selected from diatomaceous silica (earth); talc; clay; metallic stearates; alkyl bis- stearamids; glycerol monostearates; erucamid; and oleamid.

UV inhibitors, when used in the present invention, are preferably selected from 2-hydroxy-4-octoxybenzophenone; 2-hydroxy-4-isooctoxybenzophenone; 4-hydroxy-4-n-dodecyloxybenzophenone; 2-(3-di-t-butyl-2-hydroxy-5-methylphenyl-5-chlorobenzo-triazole; 2-(2-hydroxy-3,5-di-t-amylphenyl) benzo-triazole; p-t-butylphenyl salicyllate; 2,4-di-t-butylphenyl-3,5-di-t-butyl-4-hydroxybenzoate; nickel bis-ortho-ethyl(3,5-di-t-butyl-4-hydroxybenzyl) phosphonate; and 2,2',6,6'tetramethyl-4-piperidinyl sebacate.

Flame retardants, when used in the present invention, are preferably selected from decabromodiphenyl oxide; dodecachlorodimethane dibenzocyclooctane; ethylene bis-dibromo norbornane dicarboximide; ethylene bistetrabromophthalimide; and antimony trioxide.

It is important that the coating of additives strongly adheres to the surface of the polymer particles such that the bond it is not broken during transport and storage of the coated pellets. The tackifying agent used in conjunction with the additive and surfactant should provide sufficient adhesion to the particles.

The tackifying agent used in the composition of the present invention is preferably non-tacky up to about 50° C. and has a ring and ball softening point (RBSP) of between 70° C. and 110° C.

The amount of tackifying agent used in the present invention is preferably in a concentration between about 5 and 35 wt % based on the weight of the dry composition, more preferably between about 10 and 15 wt % with about 12 wt % being the most preferred.

The tackifying agent used in the composition of the present invention is preferably selected from polyolefins, halogenated polyolefins, waxes (including emulsifiable waxes and non-emulsifiable waxes). The more preferred tackifying agents are waxes and are preferably selected from microcrystalline waxes, paraffin waxes, carnauba waxes, nonemulsifiable polyethylene waxes, and emulsifiable polyethylene waxes, with nonemulsifiable polyethylene waxes and emulsifiable polyethylene waxes being most preferred.

Should an emulsifiable wax be employed in the practice of the present invention, it can be any wax that can be readily emulsified, for example, emulsifiable polyolefin waxes such as oxidized polyolefin waxes or modified polyolefin waxes. Preferred oxidized polyolefin waxes include waxes having a density in the range of about 0.92–0.96, melt viscosities in the range of about 50–4,000 cp at 125° C. and an acid number in the range of about 12–55. Exemplary waxes include an oxidized polyethylene wax having a density of 0.939, a melt viscosity of 250 cp at 125° C. and an acid number of 16; an oxidized polyethylene wax having a density of 0.942, a melt viscosity of 900 cp at 125° C. and an acid number of 15 an oxidized polyethylene wax having a density of 0.955, a melt viscosity of 250 cp at 125° C. and an acid number of 16; and a maleated polypropylene wax having a density of 0.934, a melt viscosity of 400 cp at 190° C. and an acid number of 47.

The surfactant used in the present invention can have an HLB as low as 4 but preferably has an HLB of at least 6, more preferably an HLB of at least 8, with an HLB of at least 10 being most preferred. Generally, if only a surfactant is used in the present invention that has an HLB as low as 4, the dispersion of the composition will not be very stable after standing for a few minutes. However, if this dispersion is coated quickly onto the particles of polymeric material, settleing does not occur to a significant extent. Additionally, the low HLB surfactants aid in dispersing the additives in the molten polymeric material.

The surfactant used in the present invention is preferably liquid in the range of room temperature up to about 75° C.

The amount of surfactant employed in the practice of the present invention can vary widely. Typically, the total amount of surfactants employed will fall in the range of about 0.2 to 20 wt %, based on the total weight of the dry composition, preferably 0.5 to 5 wt %, more preferably between about 2 and 5 wt %, with about 3 wt % being the most preferred.

Suitable surfactants used in the present invention can be chosen from mono and diglycerides, phosphated mono- and diglycerides, citric acid esters of monoglycerides, diacetylated tartaric acid esters of monoglycerides, glycerol monooleate, sodium stearoyl lactylates, calcium stearoyl lactylates, sulfonated esters and alpha-tocopherol hemisuccinate, phospholipids, and soy phosphatides, sorbitan fatty acid esters, polyoxyethylene sorbitan fatty acid esters, polyoxyethylene sorbitol esters, polyoxyethylene acids, polyoxyethylene alcohols, alkyl aryl sulfonates and ethoxylated secondary alcohols.

The surfactant used in the present invention is preferably selected from 2-hydroxy-4-octoxybenzophenone; 2-hydroxy-4isooctoxybenzophenone; 4-hydroxy-4-n-dodecyloxybenzophenone; 2-(3-di-t-butyl-2-hydroxy-5-methylphenyl-5-chlorobenzo-triazole; 2-(2hydroxy-3,5-di-t-amylphenyl) benzo-triazole; p-t-butylphenyl salicyllate; 2,4-di-t-butyl- phenyl-3,5-di-t-butyl-4-hydroxybenzoate; nickel bis-ortho-ethyl-(3,5-di-t-butyl-4hydroxybenzyl) phosphonate; and 2,2'6,6'tetramethyl-4-piperidinyl sebacate.

Specific examples of suitable surfactants by trade name include IGEPAL (such as IGEPAL C0630, IGEPAL CO22), ARLACEL, TWEEN, BRIJ, MYRIJ, TERGITOL (such as Tergitol 15-S-7, a alkyloxypolyethyleneoxyethanol from Union Carbide), with TERGITOL 15-S-7 (alkyloxypolyethyleneoxyethanol) being most preferred.

In an additional, more preferred feature of the present invention, the surfactant is a mixture of high and low HLB surfactants. Alternatively, prior to forming the dispersion, the HLB can be added to the water before the addition of the composition containing the low HLB surfactant. The quantity of high hydrophobic-lipophobic balance value is indicated separately to vary in the range of about 0.1 up to 10 wt %, with quantities in the range of about 0.1 up to 1 wt % being preferred.

As used herein, the term "low hydrophobic-lipophobic balance value surfactants" refers to surfactants having a hydrophobic-lipophobic balance value less than about 9, while the term "high hydrophobic-lipophobic balance value surfactant" refers to surfactant having a hydrophobic-lipophobic balance value of greater than about 9. Preferably, low hydrophobic-lipophobic balance value surfactant employed in the practice of the present invention will have a hydrophobic-lipophobic balance value falling in the range of about 2 up to 8, while preferred high hydrophobic-lipophobic balance value surfactants employed in the practice of the present invention will have a hydrophobic-lipophobic balance value of at least about 10.

A rough approximation of the hydrophobic-lipophobic balance value for a range of surfactants can be obtained by evaluation of the water solubility of the particular surfactant as summarized in the following table:

| Behavior When Added to Water | HLB Range |
| --- | --- |
| No dispersibility in water | 1–4 |
| Poor dispersion | 3–6 |
| Milky dispersion after vigorous agitation | 6–8 |
| Stable milky dispersion (upper end almost translucent) | 8–10 |
| From translucent to clear dispersion | 10–13 |
| Clear solution | 13+ |

Exemplary low hydrophobic-lipophobic balance value surfactants contemplated for use in the practice of the present invention include:
   mono- and diglycerides,
   sorbitan fatty acid esters,
   polyoxyethylene sorbitol esters,
   polyoxyethylene alcohols,
   ethoxylated alkylphenols,
   ethoxylated alcohols,
   polyalkylene glycol ethers,
   phosphated mono- and diglycerides,
   citric acid esters of monoglycerides,
   diacetylated tartaric acid esters of monoglycerides,
   glycerol monooleate,
   sodium stearoyl lactylates,
   calcium stearoyl lactylates,
   phospholipids, or
   phosphatidyl ethanolamine,
as well as mixtures of any two or more thereof.

Exemplary high hydrophobic-lipophobic balance value surfactants contemplated for use in the practice of the present invention include:
   glycerol monostearate,
   polyoxyethylene sorbitan fatty acid esters,
   polyethylene sorbitol esters,
   polyoxyethylene acids,
   polyoxyethylene alcohols,
   polyoxyethylene alkyl amines,
   alkyl aryl sulfonates, or
   ethoxylated alkylphenols,
as well as mixtures of any two or more thereof.

The invention compositions are readily dispersed in aqueous media, typically by adding up to 50 wt % of polymer additive(s) to aqueous media, and agitating sufficiently to promote contact between the particles of additive and the aqueous media. Any suitable means to promote such contacting is acceptable for the desired agitation.

Depending on factors such as the particle size of the additive(s) to be dispersed, the temperature of the aqueous media, the quantity of additive(s), the quantity (and ratio) of high and low hydrophobic-lipophobic value surfactants, and the like, the contact time required for dispersion of additive(s) can be as short as a few minutes up to 3 hours or longer. However, mild agitation at relatively short periods of time is adequate to generally disperse the composition into the water. However, this time is generally in the range of about 5 min. up to 1 hr for dispersion of the composition.

The invention compositions can be dispersed in aqueous media in large quantities. Thus, loadings of up to about 60 wt % solids in aqueous media are contemplated. Preferred loading levels fall in the range of about 25 up to 45 wt %, based on the total weight of polymer additive(s).

The above-described aqueous emulsions or dispersions are useful, for example, for applying numerous polymer additives, either alone or in combination, to a wide range of polymer particles. This is readily accomplished by contacting the polymer particles with the above described aqueous emulsion or dispersion, e.g., by spraying the dispersion on the polymer particles, mixing polymer particles with the aqueous dispersion, and the like.

Some preferred polymeric particles include, for example, polyolefins such as crystalline polypropylene, low density polyethylene, high density polyethylene and linear low density polyethylenes. Other polymeric materials include, for example, polystyrene, polyesters, polyacrylates, polyamides, polyvinyl chlorides and the like as well as copolymers such as crystalline propylene ethylene copolymers, rubbers such as ethylene propylene rubber, and the like.

The following examples are to illustrate the present invention but are not intended to limit the reasonable scope thereof.

EXAMPLES

EXAMPLE 1

This example illustrates the conversion of Irganox ® 1010 antioxidant into a water dispersible powder using two surfactants and the suspension made with this powder.

The following procedure was used. The powder raw materials are milled to an acceptable particle size distribution, if necessary. Each of the ingredients were weighed into a 4 ounce glass jar. Mixing the ingredients forms a water dispersible powder. Water was added and the bottle was shaken by hand or stirred with a magnetic stirrer.

Suspension characteristics were then noted including foam level and degree of homogeneity. Homogeneity was judged by observing if the appearance of the suspension changed from one region to another. For example, with only a hydrophobic powder in water, the powder is located all on top and is therefore not homogenous. If the sample settles or separates very quickly (such as within 1 minute), it is again not considered homogenous. The degree of wetting of the powder was also observed. The degree of wetting is observed by noting the powder's surface appearance. A non wetted powder has a distinct demarcation between the aqueous and powdered phases while a wetted powder does not have this characteristic. In between these extremes, the powder on the surface appears somewhat dry. The powder is wetted when the water spreads over the powder surface.

| Powder Composition: | (g) | (%) |
|---|---|---|
| IRGANOX 1010 antioxidant (from Ciba Geigy Corp.) | 9.98 | 85.9 |
| EPOLENE E-14 wax (an emulsifiable polyethylene wax from Eastman Chemical Company having an acid number of 16) | 1.49 | 12.8 |
| ARLACEL 80 surfactant (a surfactant having an HLB of about 4 from ICI) | 0.097 | 0.835 |
| IGEPAL CO-surfactant (a surfactant having an HLB of about 13 from GAF) | 0.049 | 0.422 |
| Water added to form suspension at approximately 35 wt % additive. | | |
| Water | 21.5 g | |

The powder formulation dispersed in water to form a homogenous suspension with light mixing.

EXAMPLE 2

This example illustrates the conversion of Irganox ® 1010 into a water dispersible powder using two surfactants (which differ from those of example 1) and the suspension made with this powder. The procedure of example 1 was repeated.

| Powder Composition: | (g) | (%) |
|---|---|---|
| IRGANOX 1010 antioxidant | 20.0 | 85.2 |
| EPOLENE E-14 wax (an | 3.00 | 12.80 |
| ARLACEL 20 surfactant (having an HLB of about 9, from ICI) | 0.235 | 1.00 |
| TWEEN 80 surfactant (having an HLB of about 15, from ICI) | 0.243 | 1.04 |
| Water added to form suspension at approximately 35% additive. | | |
| Water | 33.6 g | |

The powder formulation dispersed in water to form a homogenous suspension with light mixing.

EXAMPLE 3

This example illustrates the conversion of Irganox ® 1010 into a water dispersible powder using a single surfactant and the suspension made with this powder. The procedure of example 1 was repeated for both samples A and B.

| Sample A: | | |
|---|---|---|
| Powder Composition: | (g) | (%) |
| IRGANOX 1010 | 10.0 | 85.8 |
| EPOLENE E-14 | 1.50 | 12.9 |
| ARLACEL 80 | 0.153 | 1.31 |
| Water added to form suspension at approximately 35% additive. | | |
| Water | 21.6 g | |

The powder formulation dispersed in water to form a homogenous suspension with light mixing. Foam height was 0.2 cm. This suspension was not stable over time and started to settle out within a couple of minutes.

| Sample B: | | |
|---|---|---|
| Powder Composition: | (g) | (%) |
| IRGANOX 1010 | 10.0 | 85.8 |
| EPOLENE E-14 | 1.50 | 12.9 |
| IGEPAL CO-630 | 0.154 | 1.32 |
| Water added to form suspension at approximately 35% additive. | | |
| Water | 21.6 g | |

The powder formulation dispersed in water to form a homogenous suspension with light mixing. Foam height was 3.5 cm.

Sample A was not as well wet as Sample B. The surfactant used in Sample B is a better wetting agent than the surfactant used in Sample A.

EXAMPLE 4

This example illustrates the conversion of Irganox ® B501W into a water dispersible powder using two surfactants and the suspension made with this powder. The procedure of example 1 was repeated.

| Powder Composition: | (g) | (%) |
|---|---|---|
| IRGANOX B501W (an antioxidant from Ciba Geigy Corp.) | 10.0 | 85.6 |
| EPOLENE E-14 | 1.50 | 12.8 |
| ARLACEL 80 | 0.100 | 0.856 |
| IGEPAL CO-630 | 0.085 | 0.727 |
| Water added to form suspension at approximately 35% additive. | | |
| Water | 21.7 g | |

The powder formulation dispersed in water to form a homogenous suspension with light mixing.

EXAMPLE 5

This example illustrates the conversion of Irganox ® 1076 into a water dispersible powder using two surfactants and the suspension made with this powder. The procedure of example 1 was repeated.

| Powder Composition: | (g) | (%) |
|---|---|---|
| IRGANOX 1076 (an antioxidant from Ciba Geigy) | 10.1 | 83.9 |
| EPOLENE E-14 | 1.50 | 12.5 |
| ARLACEL 80 | 0.179 | 1.49 |
| IGEPAL CO-630 | 0.254 | 2.11 |
| Water added to form suspension at approximately 35% additive. | | |
| Water | 22.2 g | |

The powder formulation dispersed in water to form a homogenous suspension with light mixing. About 1 cm of foam was present.

EXAMPLE 6

This example illustrates the conversion of DSTDP into a water dispersible powder using two surfactants and the suspension made with this powder. The procedure of example 1 was repeated except the particle size reduction of DSTDP was done after a dispersion was made.

| Powder Composition: | (g) | (%) |
|---|---|---|
| DSTDP (distearyl thiodipropionate, a secondary antioxidant) | 10.1 | 85.3 |
| EPOLENE E-14 | 1.50 | 12.7 |
| ARLACEL 80 | 0.095 | 0.803 |
| IGEPAL CO-630 | 0.139 | 1.18 |
| Water added to form suspension at approximately 35% additive. | | |
| Water | 21.7 g | |

The powder formulation dispersed in water to form well wetted particles in water but the large particles could be easily seen and was therefore not considered well dispersed. A high shear homogenizer was used for 30 seconds to reduce the particle size. A homogenous suspension was obtained.

EXAMPLE 7

This example illustrates the conversion of DLTDP into a water dispersible powder using two surfactants and the suspension made with this powder. The procedure of example 1 was repeated except the particle size reduction of DLTDP was done after a dispersion was made.

| Powder Composition: | (g) | (%) |
|---|---|---|
| DLTDP (dilauryl thiodipropionate a secondary antioxidant) | 10.0 | 83.9 |
| EPOLENE E-14 | 1.50 | 12.6 |
| ARLACEL 80 | 0.180 | 1.51 |
| IGEPAL CO-630 | 0.239 | 2.01 |
| Water added to form suspension at approximately 35% additive. | | |
| Water | 22.1 g | |

The powder formulation dispersed in water to form well wetted particles in water but the large particles could be easily seen and was therefore not considered well dispersed. A high shear homogenizer was used for 30 seconds to reduce the particle size. A homogenous suspension was obtained.

EXAMPLE 8

This example illustrates the conversion of calcium stearate into a water dispersible powder using two surfactants and the suspension made with this powder. The procedure of example 1 was repeated.

| Powder Composition: | (g) | (%) |
|---|---|---|
| Calcium Stearate | 10.0 | 84.9 |
| EPOLENE E-14 | 1.60 | 13.6 |
| ARLACEL 80 | 0.076 | 0.645 |
| IGEPAL CO-630 | 0.110 | 0.934 |
| Water added to form suspension at approximately 35% additive. | | |
| Water | 21.9 g | |
| This powder formulation was not wetted by the water at this water concentration and was very thick. Additional water was then added to form a suspension at approximately 17.0% additive. | | |
| Water | 25.0 g | |

The powder formulation dispersed after this addition to form a homogenous suspension.

EXAMPLE 9

This example illustrates the conversion of Irganox® B-501W and Calcium Stearate into a water dispersible powder using two surfactants and the suspension made with this powder. The procedure of example 1 was repeated.

| Powder Composition: | (g) | (%) |
| --- | --- | --- |
| Blend of IRGANOX B501W and Calcium Stearate | 10.01 | 83.2 |
| EPOLENE E-14 | 1.51 | 12.6 |
| ARLACEL 80 | 0.251 | 2.09 |
| IGEPAL CO-630 | 0.253 | 2.10 |
| Water added to form suspension at approximately 35% additive. | | |
| Water | 22.5 g | |

The powder formulation dispersed in water to form a homogenous suspension with light mixing.

EXAMPLE 10

This example illustrates the conversion of Irganox® B225 into a water dispersible powder using two surfactants and the suspension made with this powder. The procedure of example 1 was repeated.

| Powder Composition: | (g) | (%) |
| --- | --- | --- |
| IRGANOX B225 (an antioxidant from Ciba-Geigy Corp.) | 10.0 | 86.4 |
| EPOLENE E-14 | 1.50 | 13.0 |
| ARLACEL 80 | 0.026 | 0.225 |
| IGEPAL CO-630 | 0.049 | 0.423 |
| Water added to form suspension at approximately 35% additive. | | |
| Water | 21.6 g | |

The powder formulation dispersed in water to form a homogenous suspension with light mixing.

EXAMPLE 11

This example illustrates the conversion of Irgafos® 168:Ethanox® 330:DHT-4A into a water dispersible powder using two surfactants and the suspension made with this powder. Also shown is the effect of having insufficient surfactant. The procedure of example 1 was repeated.

| Sample A: | | |
| --- | --- | --- |
| Powder Composition: | (g) | (%) |
| A blend of IRGAFOS 168, ETHANOX 330, and DHT-4A (Mg Al hydroxy carbonate hydrate) | 10.03 | 84.8 |
| EPOLENE E-14 | 1.50 | 12.7 |
| IGEPAL CO-210 (a surfactant having an HLB of about 5 from GAF) | 0.118 | 0.998 |
| IGEPAL CO-630 | 0.178 | 1.51 |
| Water added to form suspension at approximately 35% additive. | | |
| Water | 21.4 g | |

The powder formulation dispersed in water to form a homogenous suspension with moderate mixing. Powder was nearly completely wetted.

| Sample B: | | |
| --- | --- | --- |
| Powder Composition: | (g) | (%) |
| A blend of IRGAFOS 168, ETHANOX 330, and DHT-4A | 10.04 | 86.8 |
| EPOLENE E-14 | 1.50 | 13.0 |
| IGEPAL CO-210 | 0.015 | 0.130 |
| IGEPAL CO-630 | 0.017 | 0.147 |
| Water added to form suspension at approximately 35% additive. | | |
| Water | 21.4 g | |

The powder formulation did not wet completely even with vigorous mixing.

EXAMPLE 12

This example illustrates the conversion of Irganox® 1010 and Calcium Stearate into a water dispersible powder using a single surfactant and the suspension made with this powder. The dispersion was made following the procedure of example 1.

| Powder Composition: | (g) | (%) |
| --- | --- | --- |
| A blend of Irganox® 1076 and Calcium Stearate | 14.96 | 83.4 |
| EPOLENE E-14 | 2.27 | 12.6 |
| ARLACEL 80 | 0.714 | 3.97 |
| Water added to form suspension at approximately 35% additive. | | |
| Water | 33.4 g | |

The powder formulation dispersed in water to form a homogenous suspension with light mixing. This suspension was not stable over time and started to settle out within a couple of minutes.

EXAMPLE 13

The suspension prepared in example 12 was used to coat polypropylene particles and tested to see if the resulting coating protected the polymer particles from oxidation. Fifty gram samples of polypropylene particles (sieved to 1-2.8 mm diameter) were heated to 75° C. under nitrogen. The suspensions were diluted by adding water to obtain typical loading levels of polymer additive of 1000-2000 ppm. These particles were coated with 30 grams of the diluted formulation of Example 12 to deliver 300 ppm of calcium stearate. The pellets were heated at 75°-110° C. to remove water while continuing to maintain a nitrogen blanket. The calcium was analyzed at 22 ppm from the coated pellets corresponding to 334 ppm calcium stearate in the stabilizer coating.

Ten gram samples of coated polypropylene pellets were placed in glass pans at a monolayer thickness and placed in an air convection oven at 150° C.±5° C. There was approximately 236±18 particles/gram or 2,360 particles in each test sample. The coated sample had no color change after 25 hours, 2 yellow pellets after 47 hours, 5 more after 51 hours, and 2 more after 70 hours. A control sample with no stabilizer was all white at 5 hours and all dark brown at 25 hours. This example illustrates that the aqueous stabilizer suspensions can be used to coat polymer particles and protect them from degradation.

EXAMPLE 14

This example illustrates the use of typical mixing equipment to form a water dispersible powder. A Hobart ® mixer with a multi-wire insert was used to mix the powders while adding the surfactants. The first four ingredients, which are powders, were weighed into the mixer bowl and mixed at low speed. The surfactants were then added gradually to the powders while maintaining mixing.

| Powder Composition: | (g) | (%) |
| --- | --- | --- |
| A blend of IRGAFOS 168, ETHANOX 330 and DHT-4A | 1200. | 85.2 |
| EPOLENE E-14 | 180. | 12.8 |
| IGEPAL CO-210 | 11.2 | 0.795 |
| IGEPAL CO-630 | 17.4 | 1.24 |

A portion of the powder formulation was dispersed in water to form a homogenous suspension with light mixing.

EXAMPLE 15

This example illustrates the use of typical mixing equipment to form a water dispersible powder. A V-Blender was used to mix the powders while adding the surfactants. The procedure of example 14 was repeated except the V-blender was stopped while the surfactant was added.

| Powder Composition: | (g) | (%) |
| --- | --- | --- |
| A blend of IRGANOX 1076 and Calcium Stearate | 1705 | 85.2 |
| EPOLENE E-14 | 256 | 12.8 |
| ARLACEL 80 | 20.0 | 1.00 |
| IGEPAL CO-630 | 20.0 | 1.00 |

A portion of the powder formulation was dispersed in water to form a homogenous suspension with light mixing.

EXAMPLE 16

This example illustrates the conversion of Irganox ® 1076 into a water dispersible powder using a single surfactant, the use of a Waring blender to accomplish the mixing, and the suspension made with this powder. The two powders were placed in a Waring blender and mixed. A portion of the surfactant was then added to the powders and the material blended. This was repeated until all the surfactant was added.

| Powder Composition: | (g) | (%) |
| --- | --- | --- |
| IRGANOX 1076 | 167. | 83.5 |
| EPOLENE E-14 | 25.0 | 12.5 |
| ARLACEL 80 | 8.00 | 4.00 |

A portion of the powder formulation was dispersed in water to form a homogenous suspension with light mixing. This suspension was not stable over time and started to settle out within a couple of minutes.

EXAMPLE 17

This example illustrates the conversion of Irganox ® 1010 into a water dispersible powder using a single surfactant, the use of a Waring blender to accomplish the mixing, and the suspension made with this powder. The procedure of example 16 was repeated.

| Powder Composition: | (g) | (%) |
| --- | --- | --- |
| IRGANOX 1010 | 167. | 83.5 |
| EPOLENE E-14 | 25.1 | 12.5 |
| ARLACEL 80 | 7.99 | 3.99 |

A portion of the powder formulation was dispersed in water to form a homogenous suspension with light mixing. This suspension was not stable over time and started to settle out within a couple of minutes.

EXAMPLE 18

This example illustrates the conversion of calcium stearate into a water dispersible powder using two surfactants, the use of a Waring blender to accomplish the mixing, and the suspension made with this powder. The procedure of example 16 was repeated.

| Powder Composition: | (g) | (%) |
| --- | --- | --- |
| Calcium Stearate | 160. | 80.0 |
| EPOLENE E-14 | 24.0 | 12.0 |
| ARLACEL 80 | 8.01 | 4.00 |
| IGEPAL CO-630 | 8.01 | 4.00 |

A portion of the powder formulation was dispersed in water to form a homogenous suspension with light mixing.

EXAMPLE 19

This example illustrates the conversion of Irgafos ® 168 into a water dispersible powder using a single surfactant, the use of a Waring blender to accomplish the mixing, and the suspension made with this powder. The procedure of example 16 was repeated.

| Powder Composition: | (g) | (%) |
| --- | --- | --- |
| IRGAFOS 168 | 167. | 83.5 |
| EPOLENE E-14 | 25.1 | 12.5 |
| ARLACEL 80 | 7.97 | 3.98 |

A portion of the powder formulation was dispersed in water to form a homogenous suspension with light mixing. This suspension was not stable over time and started to settle out within a couple of minutes.

EXAMPLE 20

This example was prepared according to Example 1 except that the following ingredients were used.

| Sample A | (g) |
| --- | --- |
| Calcium Stearate | 20.00 |
| EPOLENE E-14 | 2.99 |
| ARLACEL 80 | 1.23 |
| Water | 81.65 |

A homogeneous suspension formed but the surface was dry indicating only poor wetting. High shear mixing obtained an acceptable dispersion but its stability is much less than samples prepared with higher HLB surfactants. The differences in results between this example and Example 3 are due, at least in part, to the fact that calcium stearate is more difficult to wet.

| Sample B | (g) |
|---|---|
| Calcium Stearate | 20.02 |
| EPOLENE E-14 | 3.00 |
| Water | 81.84 |

Sample B was mixed like A. A side-by-side comparison of A and B found that A was wetted substantially better than B. A small amount of each sample was diluted to about 1 wt % solids in water to examine the stability. Sample A separated slowly over a few minutes while Sample B (upon ceasing agitation) immediately and rapidly began to separate with completely unwetted powder forming at the top of the sample within one minute. The experiment shows that while a surfactant with HLB of 4 does not perform as well as higher HLB surfactants, it does perform adequately if the suspension remains agitated.

EXAMPLE 21

The additives were prepared in large quantities in stainless steel batch process equipment in a pilot facility. The following ingredients were charged to a 5.0 gallon sigma blade mixer:

| Ingredients: | (g) | (%) |
|---|---|---|
| DHT-4A | 2100 | 72.5 |
| EPOLENE E-14 | 315 | 10.9 |
| IGEPAL CO-630 | 63 | 2.36 |
| Demineralized Water | 420 | 14.5 |

The demineralized water and surfactant were poured in the mixer and allowed to stir for 5 minutes. Mixed DHT-4A and EPOLENE E-14 powder was continuously mixed until the powder was well dispersed. The dried material was easily redispersible in water.

EXAMPLE 22

Example 21 was repeated with the exception that the amount of water used was 210 g instead of 420 g in preparing water-dispersible additives. The ingredients used were as follows:

| Ingredients: | (g) | (%) |
|---|---|---|
| DHT-4A | 2100 | 78.80 |
| EPOLENE E-14 | 315 | 11.82 |
| IGEPAL CO-630 | 63 | 2.36 |
| Demineralized Water | 187. | 7.02 |

The dried material was redispersible in water. The dispersions were stable for a few hours.

EXAMPLE 23

This example illustrates the preparation of a water-dispersible form of the synthetic amorphous silica commercially known as SYLOID 244 (from W. R. Grace and Co.). An aqueous-dispersible material was prepared using the following ingredients:

| Ingredients: | (g) | (%) |
|---|---|---|
| SYLOID 244 | 100 | 37.31 |
| EPOLENE E-14 | 15 | 5.60 |
| IGEPAL CO-630 | 3 | 1.12 |
| Water | 150 | 55.97 |

The following procedure was used for converting water-insoluble SYLOID 144 into water-dispersible form.
1. Mixed EPOLENE E-14 and SYLOID 244 powder. Powder was mixed by shaking a closed container.
2. Prepared an aqueous solution of surfactant (e.g. Igepal CO-630) by adding 3.0 g surfactant to 150.0 g water during continuous agitation.
3. Dispersed mixed powder of EPOLENE E-14 and SYLOID 244 aqueous surfactant solution and allowed stirring for an hour.
4. The dispersion (step 3) was dried using a pan at 50° C. in an oven. The material was completely dried in 4 hours. The dried powder had the following composition:

| Ingredients: | (g) | (%) |
|---|---|---|
| SYLOID 244 | 100 | 84.75 |
| EPOLENE E-14 | 15 | 12.71 |
| IGEPAL CO-630 | 3 | 2.54 |

The powder was redispersed in water using a stirrer. The material dispersed easily but settled within an hour without stirring.

EXAMPLE 24

This example illustrates the use of the water dispersible powder formulations of additives to make suspensions.

| Powder Composition: | (g) |
|---|---|
| Formulation from Example 16) | 40.0 |
| Formulation from Example 18) | 12.5 |
| Dispersed into Water | 97.5 |

The powder formulations dispersed in water to form a homogenous suspension with light mixing.

EXAMPLE 25

This example illustrates the use of the water dispersible powder formulations of additives to make suspensions.

| Powder Composition: | (g) |
|---|---|
| Formulation from Example 19 | 23.0 |
| Formulation from Example 17 | 11.5 |
| Formulation from Example 18 | 18.0 |
| Dispersed into Water | 97.5 |

The powder formulations dispersed in water to form a homogenous suspension with light mixing.

EXAMPLE 26

This example illustrates suspension from Example 24 to coat polypropylene using procedure similar to that described in example 13. Calcium was analyzed at 350 ppm verses the expected 300 ppm. The pellets remained white and had not changed color after 11.5 hours in the air convection oven test run at 150° C.

EXAMPLE 27

Used suspension from example 26 to coat polypropylene using procedure similar to that described in example 13. Calcium was analyzed at 44 ppm corresponding to 670 ppm calcium stearate (target 1000 ppm). The pellets remained white and had not changed color after 11.5 hours in the air convection oven test run at 150° C.

EXAMPLE 28

The ability of the coated stabilizer to remain adhered to the polymer particles was tested in this example. Pellets were coated using the suspension from example 24 using the procedure described in example 13. Coated pellets were then placed in clean paint cans and shaken on a Red Devil paint shaker for 5 or 30 minutes. Oven tests were then performed as described in example 13. The test results were: no color change after 14 hours in coated and unshaken pellets, no color change after 14 hours for coated pellets shaken 5 minutes, no color change after 14 hours for coated pellets shaken 30 minutes, and 50% of uncoated pellets had changed color after 14 hours. This example shows the additive coating can remain adhered to the polymer.

EXAMPLE 29

The ability of the coated stabilizer to remain adhered to the polymer particles was tested in this example. Pellets were coated using the suspension from example 24 using the procedure described in example 13. Coated pellets were then placed in clean paint cans and shaken on a Red Devil pain shaker for 5 or 30 minutes. Oven tests were then performed as described in example 13. The test results were: no color change after 14 hours in coated and unshaken pellets, 1 yellow pellet after 14 hours for coated pellets shaken 5 minutes, no color change after 24 hours for coated pellets shaken 30 minutes, and 50% of uncoated pellets had changed color after 14 hours. This example shows the additive coating can remain adhered to the polymer.

EXAMPLE 30

Producing water dispersible stabilizers at Epolene ® wax concentrations was examined in this example. Also examined was the coating of some of these suspensions on polypropylene particles. The powders and suspensions were made using the procedures described in example 1.

| Sample A: | | |
|---|---|---|
| Powder Composition: | (g) | (%) |
| A blend of IRGANOX 1076 and Calcium Stearate | 30.02 | 96.6 |
| TERGITOL 15-S-7 | 1.07 | 3.44 |
| Water added to form suspension at approximately 35% additive. | | |
| Water | 54.7 | |

| Sample B: | | |
|---|---|---|
| Powder Composition: | (g) | (%) |
| A blend of IRGANOX 1076 and Calcium Stearate | 30.02 | 90.1 |
| EPOLENE E-14 | 2.25 | 6.75 |
| TERGITOL 15-S-7 | 1.07 | 3.21 |
| Water added to form suspension at approximately 35% additive. | | |
| Water | 52.4 | |

| Sample C: | | |
|---|---|---|
| Powder Composition: | (g) | (%) |
| A blend of IRGANOX 1076 and Calcium Stearate | 30.3 | 74.9 |
| EPOLENE E-14 | 9.00 | 22.4 |
| TERGITOL 15-S-7 | 1.07 | 2.67 |
| Water added to form suspension at approximately 35% additive. | | |
| Water | 45.6 | |

The powder formulation dispersed in water to form a homogenous suspension with light mixing.

| Sample D: | | |
|---|---|---|
| Powder Composition: | (g) | (%) |
| A blend of IRGANOX 1076 and Calacium Stearate | 30.03 | 61.1 |
| EPOLENE E-14 | 18.0 | 36.7 |
| TERGIROL 15-S-7 | 1.07 | 2.18 |
| Water added to form suspension at approximately 35% additive. | | |
| Water | 36.6 | |

The powder formulation dispersed in water to form a homogenous suspension with light mixing.

The trends in samples A–D, as wax level is increased, was for the foam level to decrease and the viscosity to increase.

EXAMPLE 31

Producing water dispersible stabilizers at Epolene ® wax concentrations was examined in this example. The powders and suspensions were made using the procedures described in example 1.

| Sample A: | | |
|---|---|---|
| Powder Composition: | (g) | (%) |
| DHT-4A | 30.0 | 96.6 |
| TERGITOL 15-S-7 | 1.07 | 3.44 |
| Water added to form suspension at approximately 35% additive. | | |
| Water | 54.6 | |

The powder formulation dispersed in water to form a homogenous suspension with light mixing.

| Sample B: | | |
|---|---|---|
| Powder Composition: | (g) | (%) |
| DHT-4A | 30.0 | 90.0 |
| EPOLENE E-14 | 2.26 | 6.75 |
| TERGITOL 15-S-7 | 1.07 | 3.22 |
| Water added to form suspension at approximately 35% additive. | | |
| Water | 52.4 | |

The powder formulation dispersed in water to form a homogenous suspension with light mixing.

| Sample C: | | |
|---|---|---|
| Powder Composition | (g) | (%) |
| DHT-4A | 30.0 | 74.9 |
| EPOLENE E-14 | 9.01 | 22.5 |
| TERGITOL 15-S-7 | 1.07 | 2.67 |
| Water added to form suspension at approximately 35% additive. | | |

| Sample C: | | |
|---|---|---|
| Powder Composition | (g) | (%) |
| Water | 45.7 | |

The powder formulation dispersed in water to form a homogenous suspension with light mixing.

| Sample D: | | |
|---|---|---|
| Powder Composition: | (g) | (%) |
| DHT-4A | 30.0 | 61.1 |
| EPOLENE E-14 | 18.0 | 36.7 |
| TERGITOL 15-S-7 | 1.07 | 2.18 |
| Water added to form suspension at approximately 35% additive. | | |
| Water | 36.7 | |

The powder formulation dispersed in water to form a homogenous suspension with light mixing.

The trends in samples A–D, as wax level is increased, was for the foam level to decrease and the viscosity to increase.

EXAMPLE 32

This example illustrates varying amounts of additive and tackifying agent prepared according to the procedure in Example 1. In samples A through D the active additive is IRGANOX 1010 and in samples E through H the active additive is calcium stearate. The tackifying agent in all samples is EPOLENE E-14 and the surfactant is TERGITOL 15-S-7.

| ID | Ratio Active:Wax | Grams Surfactant | Grams Water | Grams Active | Grams Tackifying Agent |
|---|---|---|---|---|---|
| A | 99:1 | 0.46 | 21.15 | 14.40 | 0.15 |
| B | 95:5 | 0.45 | 23.36 | 13.81 | 0.73 |
| C | 5:95 | 0.45 | 21.17 | 0.72 | 13.82 |
| D | 1:99 | 0.44 | 21.13 | 0.15 | 14.41 |
| E | 99:1 | 0.45 | 21.14 | 14.39 | 0.15 |
| F | 95:5 | 0.46 | 21.14 | 13.82 | 0.74 |
| G | 5:95 | 0.46 | 21.14 | 0.73 | 13.82 |
| H | 1:99 | 0.45 | 21.12 | 0.15 | 14.39 |

The invention has been revealed in detail with particular reference to preferred embodiments thereof, but it will be understood that variations and modifications can be effected within the spirit and scope of the invention.

We claim:

1. A water dispersible particulate composition comprising:
   (a) about 5 to 99 wt. % based on the total weight of the dry composition of at least one polymer additive component,
   (b) up to about 95 wt. % based on the total weight of the dry composition of at least one tackifying agent that is non-tacky up to about 50° C., wherein said tackifying agent can also be the polymer additive component of (a), and
   (c) about 0.2 to 20 wt. % based on the total weight of the dry composition of at least one surfactant, having an HLB of at least 4, wherein the surfactant is intimately coated on particles of (a) and particles of (b), or particles that comprise a mixture of (a) and (b)
   wherein said surfactant is essentially only coated on said particles and no more than 10 wt. % of the composition is in the form of permanent aggregate particles larger than 600 microns that are not easily separable in water.

2. The composition according to claim 1 wherein (a) and (b) are different and said particles are predominantly a mixture of discrete particles of (a) and particles of (b) coated with said surfactant.

3. The composition according to claim 1 wherein said additive component is selected from:
   antioxidants,
   blowing agents,
   coupling agents,
   antistatic agents,
   nucleating agents,
   metal deactivators,
   lubricants-slip/antiblocking agents,
   UV inhibitors,
   flame retardants, and mixtures thereof.

4. The composition according to claim 3 wherein said antioxidants are selected from tetrakis[methylene 3-(3',5'-di-tert-butyl- 4'-hydroxyphenyl)-propionate]methane, octadecyl 3-(3',5'-di-t-butyl-4-hydroxyphenyl)-propionate, 1,3,5-trimethyl-2,4,6-tris-(3,5-di-tert-butyl)-4-(hydroxybenzyl)benzene, bis(2,4-di-t-butylphenyl) pentaerythritol diphosphite, tris(mono nonyl-phenyl)-phosphite, 4,4'-butylidene-bis(5-methyl-2-t-butyl)-phenol, tris(3,5-di-t-butyl-4-hydroxybenzyl)-isocyanurate, tris-nonylphenyl phosphite, distearyl pentaerythritol diphosphite, tetrakis-(2,4-di-t-butylphenyl)-4,4'-biphenylylene-diphosphonite, tris-(2,3-di-t-butylphenyl) phosphite, butylated hydroxy toluene, dicetyl thiodipropionate, dimyristyl thiodipropionate, and poly(1,4-cyclohexylenedimethylene-3,3'-thiodipropionate (partially terminated with stearyl alcohol); said blowing agents are selected from modified and unmodified azodicarbonamides, and modified and unmodified azocarbonamides; said coupling agents are selected from silanes, titanates, chromium complexes, low molecular weight polyolefins (with carboxylic moieties), high molecular weight polyolefins and acrylates (with carboxylic moieties), and chlorinated paraffins; said antistatic agents are selected from ethyoxylated amines, polyethylene glycol, and quaternary ammonium compounds; said nucleating agents are selected from sodium benzoate, diphenyl phosphinic acid and salts, phenyl phosphinic acid and salts, and phenyl phosphorous acid and salts; said metal deactivators are selected from oxalyl bis(benzylidene hydrazide), and 2,2'oxamido bis-(ethyl 3-(3,5-di-t-butyl-4-hydroxy- phenyl) propionate; said lubricant slip/antiblocking agents are selected from diatomaceous silica (earth), talc, clay, metallic stearates, alkyl bis- stearamids, glycerol monostearates, erucamid, and oleamid; said UV inhibitors are selected from 2-hydroxy-4-octoxybenzophenone, 2-hydroxy-4-isooctoxybenzophenone, 4-hydroxy-4-n-dodecyloxybenzophenone, 2-(3-di-t-butyl-2-hydroxy-5-methylphenyl-5-chlorobenzo-triazole, 2-(2-hydroxy-3,5-di-t-amylphenyl) benzo-triazole, p-t-butylphenyl salicyllate, 2,4-di-t-butylphenyl-3,5-di-t-butyl-4-hydroxybenzoate, nickel bis-ortho-ethyl(3,5-di-t-butyl-4-hydroxybenzyl) phosphonate, and 2,2',6,6'tetramethyl-4-piperidinyl sebacate; said flame retardants selected from decabromodiphenyl oxide, dodecachlorodimethane dibenzocyclooctane, ethylene bis-dibromo norbornane dicarboximide, ethylene bistetrabromophthalimide, and antimony trioxide.

5. The composition according to claim 1 wherein no more than 1 wt. % of the composition is in the form of particles or permanent aggregates of particles larger than 600 microns that are not easily separable in water.

6. The composition according to claim 1 wherein the composition contains no more than about 5 wt. % water.

7. The composition according to claim 1 wherein said composition is a free-flowing powder.

8. The composition according to claim 1 wherein the surfactant has an HLB of at least 6.

9. The composition according to claim 1 wherein the surfactant is present in the composition at a concentration between about 0.5 and 5 wt %.

10. The composition according to claim 9 wherein said surfactant is a combination of both high and low HLB surfactants.

11. The composition according to claim 1 wherein the surfactant is selected from mono and diglycerides, phosphated mono- and diglycerides, citric acid esters of monoglycerides, diacetylated tartaric acid esters of monoglycerides, glycerol monooleate, sodium stearoyl lactylates, calcium stearoyl lactylates, sulfonated esters and alpha-tocopherol hemisuccinate, phospholipids, and soy phosphatides, sorbitan fatty acid esters, polyoxyethylene sorbitan fatty acid esters, polyoxyethylene sorbitol esters, polyoxyethylene acids, polyoxyethylene alcohols, alkyl aryl sulfonates and ethoxylated secondary alcohols.

12. The composition according to claim 11 wherein said surfactant is alkoxypolyethyleneoxyethanol.

13. The composition according to claim 1 wherein said tackifying agent is selected from polyolefins, halogenated polyolefins, emulsifiable waxes, and non-emulsifiable waxes.

14. The composition according to claim 13 wherein said tackifying agent is selected from non-emulsifiable polyethylene waxes and emulsifiable polyethylene waxes.

15. The composition according to claim 1 wherein said tackifying agent is present at a concentration between about 5 and 35 wt %.

16. The composition according to claim 1 wherein no more than 10 wt. % of the composition is in the form of particles or permanent aggregates of particles larger than 600 microns that are not easily separable in water by high shear mixing.

* * * * *